United States Patent [19]

Masak

[11] 4,439,769
[45] Mar. 27, 1984

[54] COMBINED ADAPTIVE SIDELOBE CANCELLER AND FREQUENCY FILTER SYSTEM

[75] Inventor: Raymond J. Masak, E. Northport, N.Y.

[73] Assignee: The United States of America as represented by the Secretary of the Air Force, Washington, D.C.

[21] Appl. No.: 618,291

[22] Filed: Oct. 2, 1975

[51] Int. Cl.³ ............................ G01S 3/16; G01S 3/28
[52] U.S. Cl. ...................................... 343/380; 455/278
[58] Field of Search ................. 343/100 LE, 100 CL; 325/305, 324, 367, 371, 374; 455/278, 296

[56] References Cited

U.S. PATENT DOCUMENTS 3,938,154  2/1976  Lewis ........................... 343/100 LE Primary Examiner—Theodore M. Blum
Attorney, Agent, or Firm—Donald J. Singer; George Fine

[57] ABSTRACT

A combined adaptive sidelobe canceller and frequency filter system eliminating the narrow band interfering signals by use of the adaptive frequency and eliminating the broad band interfering signals by the adaptive sidelobe canceller.

2 Claims, 1 Drawing Figure

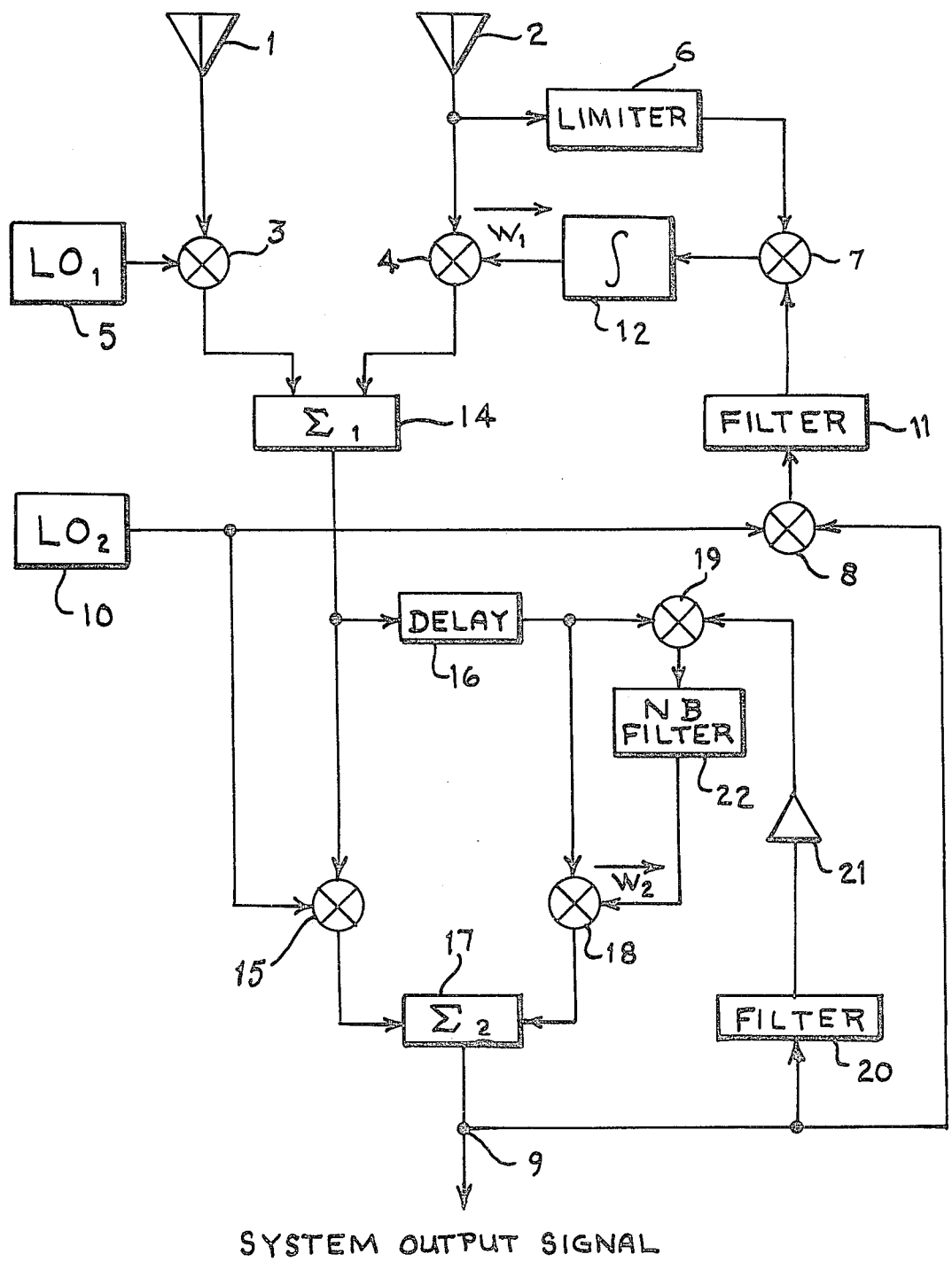
SYSTEM OUTPUT SIGNAL

COMBINED ADAPTIVE SIDELOBE CANCELLER AND FREQUENCY FILTER SYSTEM

STATEMENT OF GOVERNMENT INTEREST

The invention described herein may be manufactured and used by or for the Government for governmental purposes without the payment of any royalty thereon.

BACKGROUND OF THE INVENTION

In prior art adaptive sidelobe cancelling systems there were utilized signals received on a main antenna (usually a directional radar antenna) and an auxiliary antenna (usually a low gain omnidirectional antenna). The sidelobe cancelling portion of the system made use of an adaptive loop for varying the amplitude of the auxiliary channel signal supplied to the first summer. This variation was in accordance with an IF (intermediate frequency) comparison circuit which compared the output signal of the summer with the auxiliary channel and supplied a weighting function W 1 to the mixer in the auxiliary channel. The weighting function W 1 was automatically adjusted to be opposite in phase to a jamming signal in the sampled output.

In the present invention, there is additionally included to the above an adaptive frequency filter resulting in a unique combination of an adaptive sidelobe canceller and an adaptive frequency filter. The composite system results in the elimination of narrow band interfering signals by use of the adaptive frequency filter and the elimination of broadband interfering signals by the adaptive sidelobe canceller. Since the feedback to the sidelobe canceller is sampled after a second summer, the adaptive sidelobe canceller does not respond to narrow band interfering signals which have been eliminated by the adaptive frequency filter.

SUMMARY OF THE INVENTION

A combined adaptive sidelobe canceller and frequency filter is provided. The invention makes use of signals received on a main antenna and an auxiliary antenna. The adaptive sidelobe cancelling portion of the system makes use of an adaptive loop for varying the amplitude of the auxiliary channel signal supplied to a first summer. This variation is in accordance with an IF comparison circuit which compares the output signal of the summer with the auxiliary channel signal and supplies a weighting function W 1 to a mixer in the auxiliary channel. The weighting function W 1 is automatically adjusted to be opposite in phase to a jamming signal in the sampled output. An adaptive frequency filter is located between the output of the first summer and the point at which the sample is taken for the adaptive sidelobe canceller. This circuit divides the output of the first summer into two paths, one of which goes through a single mixer stage to a second summer, the other of which is supplied by a delay line to another mixer, and then to the summer. The second mixer through which the delayed signal goes to the summer has as its local oscillator input a second weighting function W 2 which is the reciprocal of the correlation between the output of the second summer and the delayed signal. This second adaptive loop causes cancellation of narrow band interfering signals since only narrow band signals have a significant correlation following the delay.

DESCRIPTION OF THE DRAWING

The single FIGURE of the present invention shows in block diagram form a preferred embodiment of the combined adaptive sidelobe canceller and frequency filter.

DETAILED DESCRIPTION OF THE PREFERRED EMBODIMENT

Now referring in detail to the single FIGURE, there is shown main antenna 1 and auxiliary antenna 2 receiving incoming signals. Antenna 1 usually is a directional radar antenna and antenna 2 a low gain omnidirectional antenna. The main antenna 1 and auxiliary antenna receive incoming signals which are fed to mixers 3 and 4, respectively. Mixer 3 also receives a signal of a first predetermined frequency from local oscillator 5. From antenna 2, the received signal also is passed through limiter 6 to mixer 7. Mixer 8 receives simultaneously two input signals, one being the output signal from point 9 and the other a signal having a second predetermined frequency from local oscillator 10. The output signal from mixer 8 is passed through preselected filter 11 to mixer 7. The resultant signal is passed through integrator 12 to mixer 4.

The output signals from mixers 3 and 4 are fed to first summer 14. The resultant signal from summer 14 is fed simultaneously to mixer 15 and to preselected delay 16. Mixer 15 also receives the signal from local oscillator 10 to provide a signal to second summer 17. The delayed signal is simultaneously received by mixers 18 and 19. The output signal from point 9 is fed through preselected filter 20 and amplifier 21 to mixer 19. The signal from mixer 19 is passed through preselected narrow band filter 22 to mixer 18. The signal from mixer 18 is fed to second summer 17 which provides the output signal therefrom at point 9.

As in prior art adaptive sidelobe cancelling systems, the invention makes use of signals received on main antenna 1 and auxiliary antenna 2. As in prior art systems the adaptive sidelobe cancelling portion of the system makes use of an adaptive way for varying the amplitude of the auxiliary channel signal supplied to first summer 14. This variation is in accordance with an IF (intermediate frequency) comparison circuit which compares the output signal of first summer 14 with the auxiliary channel and supplies a weighting function W 1 (as shown in the single FIGURE) to the mixer in the auxiliary channel. The weighting function W 1 is automatically adjusted to be opposite in phase to a jamming signal in the sampled output.

In the system of the single FIGURE, there is uniquely and additionally included an adaptive frequency filter which is located between the output of first summer 14 and the point at which the sample is taken for the adaptive sidelobe canceller. This circuit divides the output of first summer 14 into two paths, one of which goes through a single mixer stage to second summer 17, the other which is supplied by delay 16 to another mixer and then to summer 17. The second mixer through which the delayed signal goes to summer 17 has as its local oscillator input a second weighting function W 2 (shown in the single FIGURE) which is the reciprocal of the correlation between the output of second summer 17 and the delayed signal. This second adaptive loop causes cancellation of narrow band interfering signals since only narrow band signals have a significant correlation following the delay.

The system of the present invention results in the elimination of narrow band interfering signals by use of the adaptive frequency filter and eliminating of broad band interfering signals by the adaptive sidelobe canceller. Since the feedback to the adaptive sidelobe canceller is sampled after the second summer, the adaptive sidelobe canceller does not respond to narrow band interfering signals which have been eliminated by the adaptive frequency filter.

What is claimed is:

1. A combined adaptive sidelobe canceller and frequency filter system providing output signals free of broad band and narrow band interfering signals comprised of main antenna means, auxiliary antenna means, each receiving identical signals including interfering signals, a first mixer, a first local oscillator providing a first local oscillator signal of a first preselected frequency, said first mixer receiving said main antenna signals and said first local oscillator signal to provide a first mixer signal, second, third, and fourth mixers, a second local oscillator providing a second local oscillator signal of a second preselected frequency, said second mixer receiving said second local oscillator signal and said system output signals to provide a second mixer signal, first means to filter said second mixer signal at a first predetermined frequency for application to said third mixer, limiter means receiving signals from said auxiliary antenna means also for application to said third mixer to provide third mixer signals, means to integrate said third mixer signals for application to said fourth mixer, said fourth mixer also receiving signals from said auxiliary antenna means to provide fourth mixer signals, a first summer receiving said first and fourth mixer signals to provide a first resultant signal, a fifth mixer receiving said first resultant signal and said second local oscillator signal and providing a fifth mixer signal, delay means receiving said first resultant signal to provide a preselected delay, a sixth mixer and seventh mixer, each receiving the delayed signal, said sixth mixer also receiving said system output signals to provide sixth mixer signals, means to narrow band filter said sixth mixer signals for application to said seventh mixer to provide seventh mixer signals, a second mixer receiving said fifth and seventh mixer signals to provide said system output signals therefrom.

2. A combined adaptive sidelobe canceller and frequency filter system as described in claim 1 including second filter means at a predetermined frequency bandwidth, and an amplifier in a series arrangement interposed between the output from said second summer and said sixth mixer.

* * * * *